(12) United States Patent
Michotte de Welle et al.

(10) Patent No.: US 10,892,704 B2
(45) Date of Patent: Jan. 12, 2021

(54) SOLAR ARRAY WITH REFERENCE SOLAR POWER PLANT FOR IMPROVED MANAGEMENT

(71) Applicant: NEXTracker Inc., Fremont, CA (US)

(72) Inventors: Madyan Michotte de Welle, Marseilles (FR); Jérôme Arliaud, Rousset (FR)

(73) Assignee: NEXTRACKER INC., Fremont, CA (US)

( * ) Notice: Subject to any disclaimer, the term of this patent is extended or adjusted under 35 U.S.C. 154(b) by 222 days.

(21) Appl. No.: 16/067,939

(22) PCT Filed: Dec. 27, 2016

(86) PCT No.: PCT/FR2016/053672
§ 371 (c)(1),
(2) Date: Jul. 3, 2018

(87) PCT Pub. No.: WO2017/118796
PCT Pub. Date: Jul. 13, 2014

(65) Prior Publication Data
US 2020/0153381 A1    May 14, 2020

(30) Foreign Application Priority Data
Jan. 4, 2016   (FR) ....................................... 16 50014

(51) Int. Cl.
*H02S 20/23*    (2014.01)
*G05D 3/10*    (2006.01)
(Continued)

(52) U.S. Cl.
CPC ............ *H02S 20/32* (2014.12); *F24S 30/425* (2018.05); *G05D 3/105* (2013.01); *F24S 2050/25* (2018.05)

(58) Field of Classification Search
CPC ......... H02S 20/32; F24S 30/425; G05D 3/105
See application file for complete search history.

(56) References Cited

U.S. PATENT DOCUMENTS

| 4,013,885 A | 3/1977 | Blitz |
| 2008/0295883 A1 | 12/2008 | Ducellier et al. |

(Continued)

FOREIGN PATENT DOCUMENTS

GB    2467197 A    7/2010

OTHER PUBLICATIONS

International Search Report dated Apr. 19, 2017 re: Application No. PCT/FR2016/053672, pp. 1-2, citing: GB 2 467 197 A, US 2013/056614 A1 and US 2014/014157 A1.
(Continued)

*Primary Examiner* — Jayne L Mershon
(74) *Attorney, Agent, or Firm* — Weber Rosselli & Cannon LLP

(57) ABSTRACT

Solar array including solar modules distributed in rows (10), each solar module having a solar collector carried by a single-axis solar tracker (4), a reference solar power plant including a central reference solar module and at least one secondary reference solar module, and a piloting unit adapted for: piloting the angular orientation of the central reference module according to a central reference orientation setpoint corresponding to an initial orientation setpoint, piloting the orientation of each secondary reference module according to a secondary reference orientation setpoint corresponding to the initial orientation setpoint shifted by a predefined offset angle; receiving an energy production value from each reference module; piloting the orientation of the modules, except for the reference modules, by applying the reference orientation setpoint associated to the reference module having the highest production value.

12 Claims, 3 Drawing Sheets

(51) Int. Cl.
*F24S 30/425* (2018.01)
*H02S 20/32* (2014.01)
*F24S 50/20* (2018.01)

(56) References Cited

U.S. PATENT DOCUMENTS

| | | |
|---|---|---|
| 2010/0000517 A1 | 1/2010 | Zalusky |
| 2011/0083718 A1 | 4/2011 | Wichner |
| 2013/0042901 A1 | 2/2013 | Deng |
| 2013/0056614 A1 | 3/2013 | Balachandreswaran et al. |
| 2014/0014157 A1 | 1/2014 | Lee et al. |
| 2015/0340998 A1* | 11/2015 | Park .................. H03F 1/301 330/256 |
| 2018/0054156 A1* | 2/2018 | Lokey .................. F24S 40/85 |
| 2018/0152134 A1* | 5/2018 | Arliaud .................. H02S 20/32 |

OTHER PUBLICATIONS

Brazilian Office Action issued in application No. BR112018013239 dated Sep. 8, 2020 with partial English ranslation, 6 pages.
Extended European Search Report issued in EP Application No. 201799343 dated Nov. 18, 2020, with English translation, 12 pages.

\* cited by examiner

SOLAR ARRAY WITH REFERENCE SOLAR POWER PLANT FOR IMPROVED MANAGEMENT

TECHNICAL FIELD

The present invention relates to a solar array comprising a plurality of solar modules distributed in several parallel rows, as well as to a method for managing such a solar array.

It relates more particularly to a solar array in which each solar module comprises at least one solar collector, in particular of the photovoltaic panel type, carried by a single-axis solar tracker, wherein each solar tracker is piloted in rotation about a main axis by means of an actuator for a rotation of the solar module allowing tracking the Sun during its rise and set from east to west.

BACKGROUND

The invention therefore concerns the field of solar arrays comprising solar trackers, otherwise called solar tracker support systems, distributed in parallel rows and supporting solar collectors, wherein the solar trackers are of the single-axis type that is to say rotating along a single main axis, for a rotation allowing tracking the Sun during its rise and set from east to west. For accuracy, such a main axis extends generally horizontally and substantially parallel to the ground on which the solar tracker is anchored.

Within the same row, the solar trackers are aligned, with their main axes substantially coincident, generally in a north-south direction.

In a conventional solar array, it is known to provide a piloting unit of the angular orientation of the solar modules, wherein the piloting unit is connected to the actuators to servo-control the angular orientation of the solar modules by applying a common orientation setpoint to all solar modules.

This common orientation setpoint is generally established on the basis of an astronomical calculation of the position of the Sun, for a real-time positioning facing the Sun, with possibly horizontal flattening phases of the solar collectors, at the beginning and the end of the day. This common orientation setpoint depends in particular on the date, because the position of the Sun varies from one day to another throughout the seasons.

However, this type of servo-control based only on the astronomical calculation of the position of the Sun, has a major drawback by offering a yield deficit under certain meteorological conditions, and in particular in cloudy conditions which are causes of diffuse solar radiation. The diffuse solar radiation occurs when the direct solar radiation is dispersed in the clouds and the atmospheric particles. The diffuse solar radiation results from the diffraction of light by the clouds and the various molecules in suspension in the atmosphere. The diffuse solar radiation therefore does not necessarily follow the direction defined by the Sun in the direction of the observation point on the Earth's surface. Consequently, under cloudy conditions, it may be preferable, in order to obtain a maximum yield with regards to these conditions, to orientate the solar trackers or modules on an orientation called indirect or diffuse orientation which does not necessarily correspond to the direction of the direct solar radiation.

Furthermore, the solar collector may be of the double-sided type, that is to say with an upper productive face facing the Sun and a lower face also productive facing the ground. The lower face receives the solar radiation reflected by the ground, generally called albedo. Thus, depending on the albedo, it may be preferred, in order to obtain a maximum yield, to orientate the solar trackers or modules on an orientation called indirect orientation which does not necessarily correspond to the direction of the direct solar radiation.

BRIEF SUMMARY

The present invention aims to solve these drawbacks by proposing a solar array, and an associated management method, which allow servo-controlling the solar modules on a common orientation setpoint which will take into account, at least partially, the diffuse radiation and/or the albedo.

To this end, it proposes a solar array comprising a plurality of solar modules distributed in several parallel rows, each solar module comprising at least one solar collector, in particular of the photovoltaic panel type, carried by a single-axis solar tracker, wherein each solar tracker is piloted in rotation about a main axis by means of an actuator for a rotation of the solar module allowing tracking the Sun during its rise and set from east to west, said solar array further comprising a piloting unit of the angular orientation of the solar modules, said piloting unit being linked to the actuators to servo-control the angular orientation of the solar modules by applying a common orientation setpoint to all solar modules, said solar array being noteworthy in that it comprises a reference solar power plant comprising at least two reference solar modules, including a central reference solar module and at least one secondary reference solar module, wherein the piloting unit is adapted for:
  piloting the angular orientation of the central reference solar module according to a reference orientation setpoint called central reference orientation setpoint corresponding to an initial orientation setpoint,
  piloting the orientation of the or each secondary reference solar module according to a reference orientation setpoint called secondary reference orientation setpoint, said secondary reference orientation setpoint corresponding to the initial orientation setpoint shifted by a predefined non-zero angle called offset angle associated to said secondary reference solar module, the central reference solar module being accordingly associated to a zero offset angle;
  receiving a solar energy production value from each reference solar module;
  piloting the angular orientation of the solar modules, except for the reference solar modules, by applying as a common orientation setpoint the reference orientation setpoint associated to the reference solar module having the highest solar energy production value.

Thus, the reference solar power plant will allow testing an initial orientation setpoint (for example a direct solar radiation tracking setpoint) and at least one secondary reference orientation setpoint (advantageously several secondary reference orientation setpoints) angularly shifted relative to the initial orientation setpoint of an offset angle. Most of the time, it is the initial orientation setpoint which will be applied, but in the case of cloud, and therefore of diffuse radiation, and/or in case of a high albedo, a shift of an offset angle may prove to offer a better solar energy production, and therefore the reference solar power plant will allow noticing that a secondary reference orientation setpoint associated to an offset angle is to be privileged, and therefore the piloting unit will implement a shift of the offset angle for the set of solar modules, except for the reference solar modules. The more secondary reference solar modules are, the more it will be possible to test different offset angles.

This solution is in particular simple and inexpensive to implement, while providing an improvement in the overall solar energy production of the solar array, since it directly takes into account the solar energy production for one or more offset angle(s) about the initial orientation setpoint.

According to a feature, the reference solar power plant comprises several secondary reference solar modules each associated to a dedicated offset angle.

According to another feature, the reference solar power plant comprises a number N of secondary reference solar modules associated to positive offset angles and a number M of secondary reference solar modules associated to negative offset angles, wherein N and M are integers.

Four general configurations are possible:
- if N=M≠0, then the reference solar power plant comprises at least one pair of secondary reference solar modules associated respectively to a positive offset angle and to a negative offset angle.
- if N≠0 and M=0, then the reference solar power plant comprises only secondary reference solar modules associated to positive offset angles;
- if N=0 and M≠0, then the reference solar power plant comprises only secondary reference solar modules associated to negative offset angles;
- if N≠0, M≠0 and N≠M, then the reference solar power plant comprises a different number of secondary reference solar modules associated to positive offset angles than that of secondary reference solar modules associated to negative offset angles.

In a particular embodiment, at least one deviation between two adjacent offset angles is less than 3 degrees in absolute value; one of these two offset angles being may correspond to the zero offset angle of the central reference solar module.

In other words, the angular shift between the orientation setpoints of at least two adjacent reference solar modules does not exceed 3 degrees, which is sufficient to test different offset angles.

It should be noted that the deviation between two adjacent offset angles may be constant or on the contrary not be constant.

According to a possibility of the invention, the solar array comprises, at an input of the piloting unit, a calculation unit of the initial orientation setpoint depending on an astronomical calculation of the position of the Sun.

It is also possible to consider that the calculation unit is adapted to calculate the initial orientation setpoint depending on at least one of the following parameters: minimum and maximum orientations accessible to the solar trackers, shadings of the solar modules of a row on the solar modules of an adjacent row.

According to another possibility of the invention, the piloting unit is adapted to pilot the angular orientation of the solar modules, except for the reference solar modules, by applying as a common orientation setpoint the secondary orientation setpoint applied to a secondary reference solar module having the highest solar energy production value, only if this secondary reference solar module has the highest solar energy production value for a predefined waiting time.

Thus, a waiting time is set before switching to a secondary orientation setpoint, to avoid changing the orientation more or less often and more or less quickly. Indeed, each orientation change solicits at least one actuator (generally an electric motor), generating an electrical consumption and a wear of the mechanical members solicited by the orientation change (bearings, elements for guiding in rotation, . . . ). These electrical consumptions and these wears will not necessarily be compensated by the productivity gains obtained by matching the secondary orientation setpoints.

The invention also relates to a method for managing a solar array in accordance with the invention, said method comprising the following steps carried out repeatedly:
- calculating an initial orientation setpoint;
- piloting the angular orientation of the central reference solar module according to a reference orientation setpoint called central reference orientation setpoint corresponding to the initial orientation setpoint;
- piloting the orientation of the or each secondary reference solar module according to a reference orientation setpoint called secondary reference orientation setpoint, said secondary reference orientation setpoint corresponding to the initial orientation setpoint shifted by a predefined non-zero angle called offset angle associated to said secondary reference solar module;
- receiving a solar energy production value from each reference solar module;
- piloting the angular orientation of the solar modules, except for the reference solar modules, by applying as a common orientation setpoint the reference orientation setpoint associated to the reference solar module having the highest solar energy production value.

In accordance with an advantageous feature of the invention, if the highest solar energy production value is associated to the secondary reference orientation setpoint associated to a secondary reference solar module, then the method implements the piloting of the angular orientation of the solar modules, except for the reference solar modules, by applying as a common orientation setpoint said secondary reference orientation setpoint, only if this secondary reference solar module has the highest solar energy production value for a predefined waiting time.

Advantageously, the waiting time is established depending on at least one of the following parameters:
- an energy consumption necessary to modify the orientation of the solar modules, except for the reference solar modules, the offset angle associated to the secondary reference solar module having the highest solar energy production value;
- a wear rate of mechanical members of the solar trackers of the solar modules, except for the reference solar modules, solicited during a change of orientation of the offset angle associated to the secondary reference solar module having the highest solar energy production value.

BRIEF DESCRIPTION OF THE DRAWINGS

The present invention also concerns the feature according to which the the initial orientation setpoint is calculated depending on an astronomical calculation of the position of the Sun.

Other features and advantages of the present invention will appear upon reading the detailed description below, of a non-limiting implementation example, with reference to the appended figures in which.

DETAILED DESCRIPTION

Figure 1:
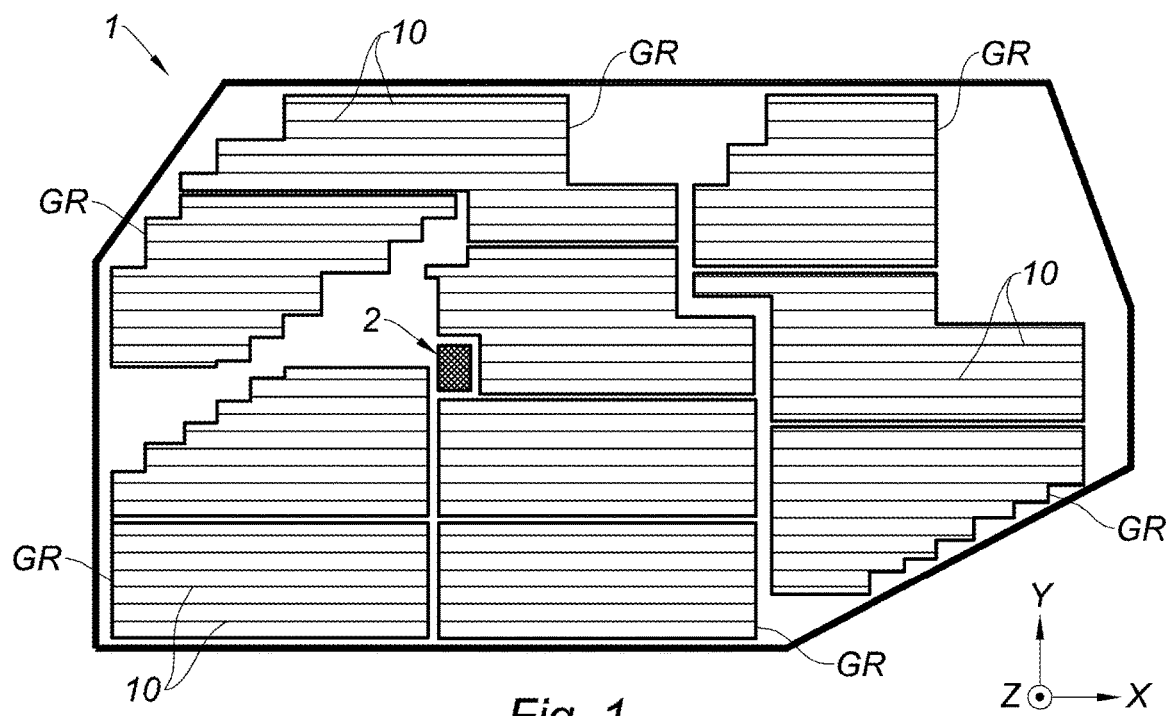
FIG. 1 is a schematic view of a solar array in accordance with the invention.

FIG. 1 illustrates a solar array 1 in accordance with the invention, comprising several groups GR of several rows 10 of solar modules (these solar modules being not illustrated in FIG. 1 and seen in FIG. 2), these groups GR and these rows 10 being distributed and sized depending on the morphology of the ground which accommodates the solar array 1. The solar array 1 also includes a reference solar power plant 2 described later.

Figure 2:
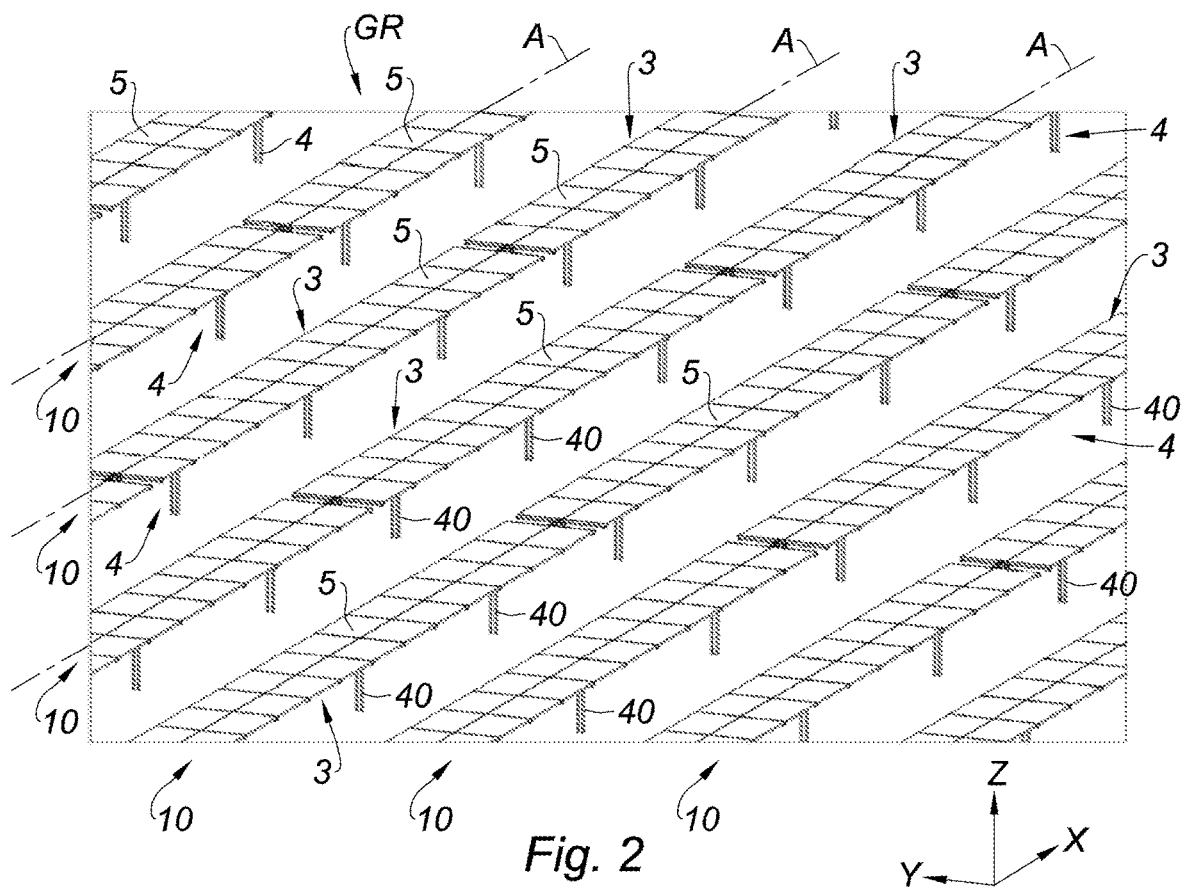
FIG. 2 is a schematic perspective view of several rows of solar modules in a solar array in accordance with the invention.

With reference to FIG. 2, each row 10 comprises several solar modules 3 aligned in the north-south direction and arranged side by side within the row 10.

Each solar module 3 comprises a single-axis solar tracker 4 rotating about a main axis of rotation A, of the type comprising:
- a fixed structure 40 for anchoring on the ground constituted, for example, of one or more pylon(s) anchored to the ground for example by beating, screwing, bolting, ballasting, or other equivalent means allowing fastening and stabilizing the fixed structure 40 on the ground;
- a movable structure (not shown), in particular of the platform type composed of an assembly of beams, stringers and/or cross members, wherein the movable structure is mounted in rotation on the fixed structure 40 along the main axis A, and in particular mounted in rotation on the upper ends of the pylon(s);
- a mechanical system for driving in rotation the movable structure along the main axis A.

Each solar tracker 3 is piloted in rotation about the main axis A thereof by means of an actuator (not illustrated) for a rotation of the solar module 3 allowing tracking the Sun during its rise and set from east to west. This actuator may be specific to each solar module 3, or may be shared between several solar modules 3, for example within the same row 10, or even two or more rows 10.

Each solar module 3 further comprises at least one solar collector 5, and in particular one or more photovoltaic panel(s), supported by or mounted on the movable structure of the solar tracker 4. For the rest of the description, the solar collectors are photovoltaic panels 5.

Referring to FIG. 2, the axis of rotation A is substantially horizontal and directed in the north-south direction. When the solar tracker 1 is horizontal or flat down (as seen in FIG. 2), the photovoltaic panel(s) 5 are horizontal and extending in a horizontal plane defined by a longitudinal axis X (parallel to the main axis A) in the north-south direction and by a transverse axis Y in the east-west direction, orthogonally to a vertical axis Z.

For the rest of the description, the angular orientation, otherwise called inclination angle, of a solar module 3 (or angular orientation of the solar tracker 3 and of the photovoltaic panel(s) 5) corresponds to the angle of the normal to the photovoltaic panel(s) 5 regarding to the vertical axis Z taken in a horizontal plane (X, Y). Accordingly, when the solar tracker 1 is horizontal or flat down (as schematized in FIG. 2), this angular orientation is 0 degrees.

Figure 5:
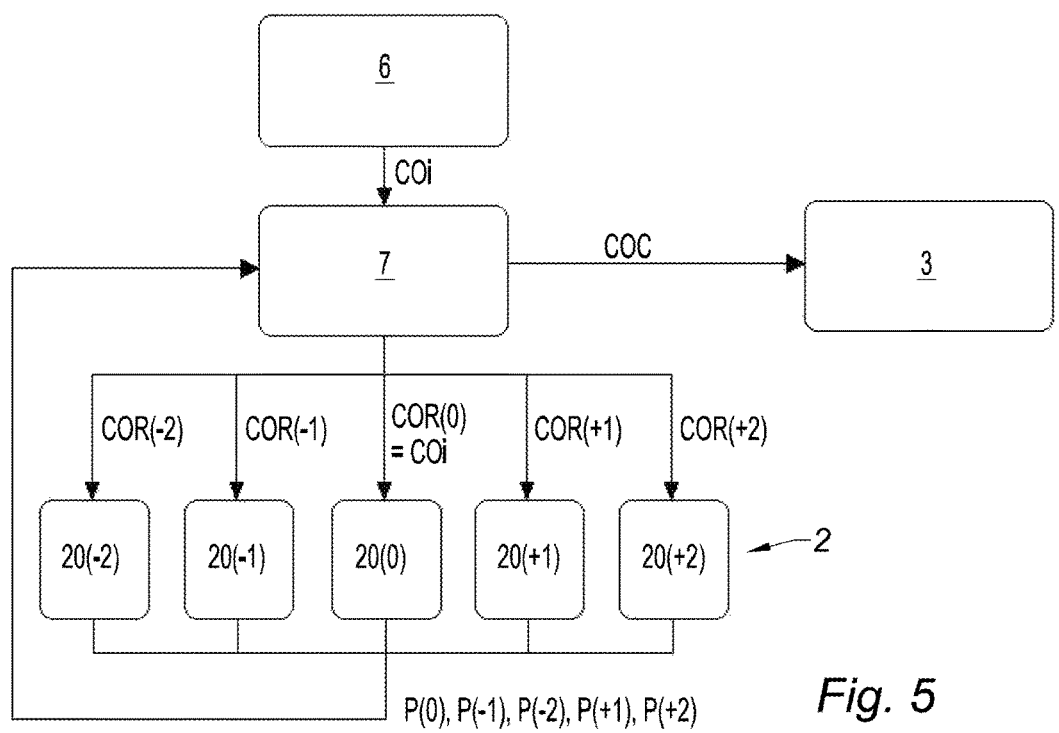
FIG. 5 is a representation in the form of a flowchart of the steps implemented during a management method in accordance with the invention.

With reference to FIG. 5, the solar array 1 further comprises a calculation unit 6 adapted to calculate an initial orientation setpoint COI depending on an astronomical calculation of the position of the Sun.

Figure 6:
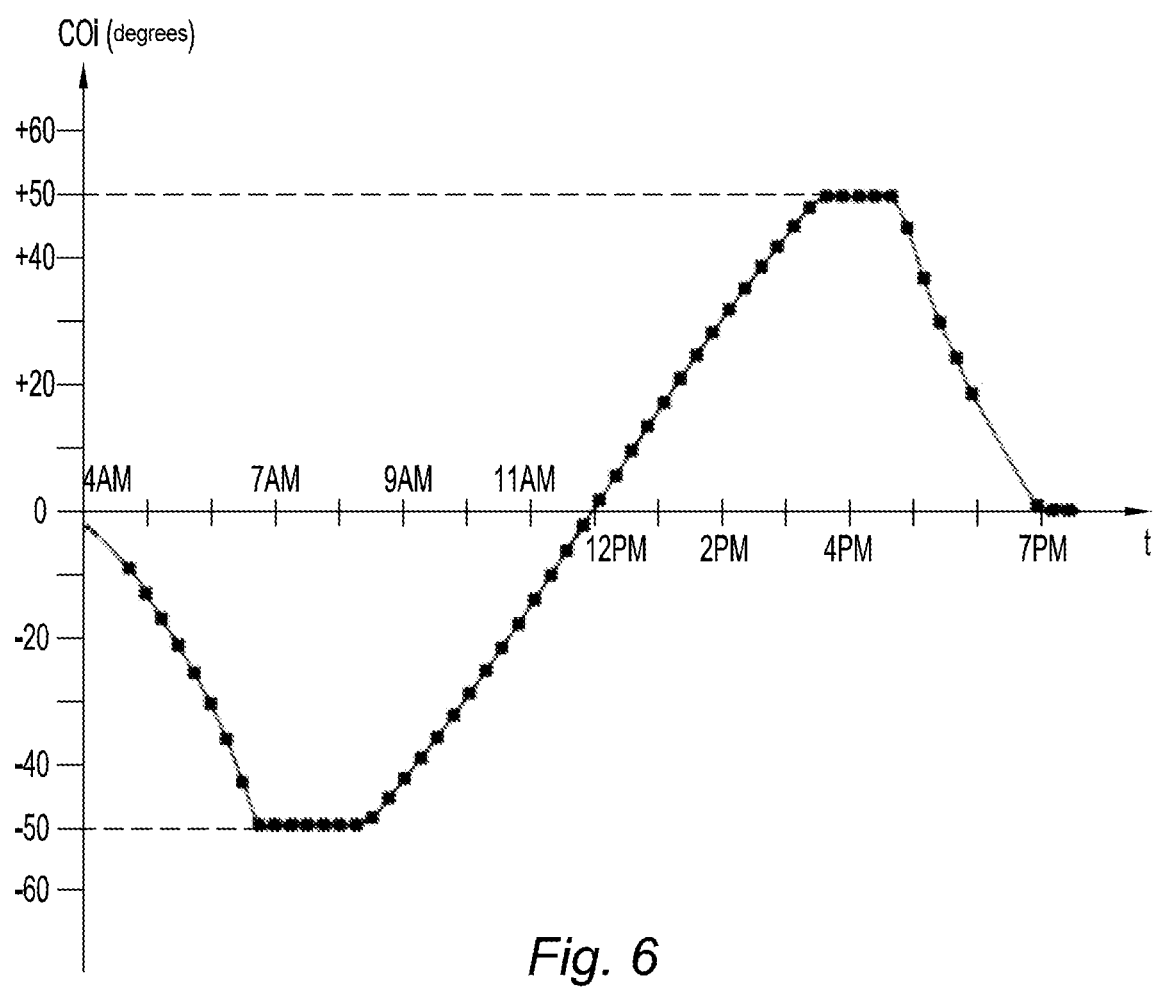
FIG. 6 is a schematic representation of a variation curve of the initial orientation setpoint as a function of time, at a given date.

FIG. 6 illustrates an example of variation of the initial orientation setpoint COI as a function of time t, at a given date, over a time range of one day taken between 4 o'clock in the morning (4 AM) and 7 o'clock in the evening (7 PM). It should be noted that this variation has stages of −50 degrees in the morning and +50 degrees in the afternoon, corresponding to the maximum and minimum orientations of the solar module 3, because the rotation of the solar module 3 is limited for mechanical reasons.

This initial orientation setpoint COI may also be calculated depending on other parameters, such as for example an optimization taking into account the shading phenomena of the solar modules 3 of a row 10 on the solar modules 3 of an adjacent row 10.

With reference to FIG. 5, the solar array 1 also comprises a piloting unit 7 adapted to pilot the angular orientation of the solar modules 3 of the rows 10 of the groups GR, this piloting unit 7 being linked to the actuators of these solar modules 3 to servo-control their angular orientations by applying a common orientation setpoint COC to all these solar modules 3.

This piloting unit 7 is connected at an input to the calculation unit 6 in order to receive as input data the initial orientation setpoint COI and is connected at an output to these solar modules 3 (and more specifically to their actuators) in order to output the common orientation setpoint COC which will be applied to all solar modules 3.

This piloting unit 7 is also connected to the reference solar power plant 2 to establish this common orientation setpoint COC depending on the initial orientation setpoint COI and also depending on a response of this reference solar power plant 2.

Figure 3:
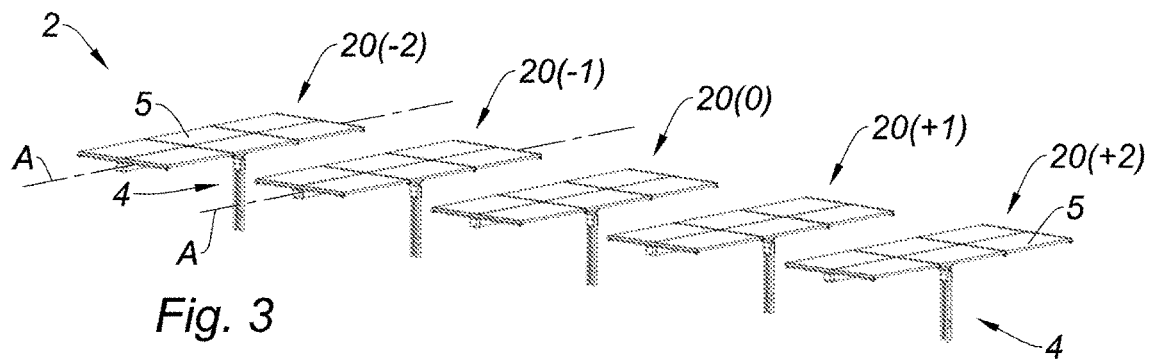
FIGS. 3 and 4 are schematic perspective views of two examples of a reference solar power plant.
Figure 4:
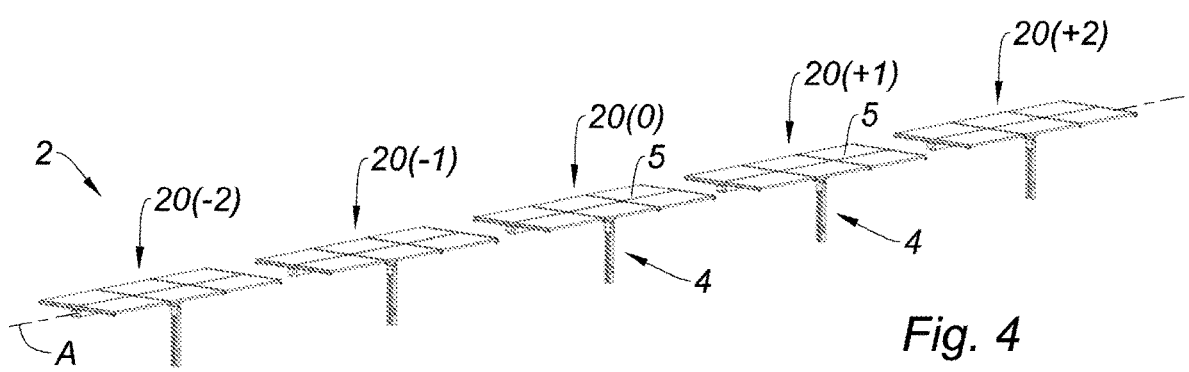

With reference to FIGS. 3 and 4, the reference solar power plant 2 comprises a plurality of reference solar modules 20($i$) ($i$ relative integer), including a central reference solar module 20(0) and a several secondary reference solar modules 20($j$) (j non-zero relative integer). In the example of FIGS. 3 to 5, the reference solar power plant 2 comprises two pairs of secondary reference solar modules, namely a first pair of secondary reference solar modules 20(+1), 20(−1), and a second pair of secondary reference solar modules 20(+2), 20(−2).

The reference solar modules 20($i$) are of the same type as the solar modules 3 described above, but they may possibly have different dimensions. The reference solar modules 20($i$) thus comprise a tracker support 4 movable in rotation along a main axis A and supporting at least one solar collector 5 of the same technology as the solar collectors 5 of the solar modules 3.

Within the reference solar power plant 2, these reference solar modules 20($i$) may for example be aligned orthogonally to their main axes A of rotation (as shown in FIG. 3), or be aligned along their main axes A of rotation.

The piloting unit 7 is adapted for:
- piloting the angular orientation of the central reference solar module 20(0) according to a reference orientation setpoint called central reference orientation setpoint COR(0) corresponding to the initial orientation setpoint COI (in other words COR(0)=COI and an associated zero offset angle OFF(0));
- piloting the orientation of each secondary reference solar module 20($j$) according to an associated secondary reference orientation setpoint COR (j), this secondary reference orientation setpoint COR(j) corresponding to the initial orientation setpoint COI shifted by a predefined angle called offset angle OFF(j) associated to the secondary reference solar module 20(*j*) (in other words COR(j)=COI+OFF(j)).

Thus, the piloting unit 7 controls the angular orientation of the central reference solar module 20(0) so that it follows the curve of the initial orientation setpoint COI. In addition, the piloting unit 7 pilots the angular orientation of each secondary reference solar module 20(*j*) so that it follows the curve of the initial orientation setpoint COI shifted from the offset angle OFF(j) dedicated to the secondary reference solar module 20 (*j*).

For each pair of secondary reference solar modules 20(+1), 20(−1) (respectively 20(+2), 20(−2)), a secondary reference module 20(+1) (respectively 20(+2)) is associated to a positive offset angle OFF(+1) (respectively OFF(+2)) and the other secondary reference module 20(−1) (respectively 20(−2)) is associated to a negative offset angle OFF(−1) (respectively OFF (−2)). In addition, OFF(−1) and OFF(+1) (respectively OFF(−2) and OFF(+2)) are equal in absolute value.

In general, j=+k or −k (wherein k positive integer), and OFF(+k)=+Ak and OFF(−k)=−Ak, wherein Ak is a positive angle. In other words, the positive offset angle (+Ak) and the negative offset angle (−Ak) of each pair of secondary reference solar modules 20(+k), 20(−k) are equal in absolute value.

It should be noted that the higher j is in absolute value (in other words, the higher k is), and the higher the offset angle OFF(i) (in other words OFF(+k) or OFF(−k)) is in absolute value.

In addition, the offset angles of smaller absolute value, that is to say the offset angles OFF(+1) and OFF(−1), are less than or equal to 3 degrees in absolute value. In other words, |OFF(+1)|=|OFF(−1)|=A1≤3 degrees.

In addition, the deviation between two adjacent offset angles is less than or equal to 3 degrees in absolute value. In other words, |OFF(i)−OFF(i+1)|≤3 degrees and |OFF(i)−OFF(i−1)|≤3 degrees.

It may be considered that |OFF(i)−OFF(i+1)|=|OFF(i)−OFF(i−1)|=PA. In other words, the pitch PA is constant between the offset angles, so that OFF(i)=i·PA, with a zero offset angle OFF(0) for the central reference solar module 20(0) (wherein i=0). This pitch PA is positive, non-zero and less than or equal to 3 degrees. Therefore, OFF(+1)=PA, OFF(−1)=−PA, OFF(+2)=2·PA and finally OFF(−2)=−2·PA. Thus, we have the following general relation: COR(i)=COI+i·PA.

It is of course conceivable that the deviation between two adjacent offset angles OFF(i) varies, in other words the pitch capable of being not constant.

It may be also considered to have more secondary reference solar modules 21(*j*) associated to positive offset angles OFF(j), or conversely to have more secondary reference solar modules 21(*j*) associated to negative offset angles OFF(j). In other words, it is conceivable that the reference solar power plant 2 comprises:
secondary reference solar modules 20(*j*) associated only to positive offset angles OFF(j); or
secondary reference solar modules 20(*j*) associated only to negative offset angles OFF(j); or
P1 secondary reference solar modules 20(*j*) associated to positive offset angles OFF(j) and P2 secondary reference solar modules 20(*j*) associated to negative offset angles OFF(j), wherein P1 and P2 are non-zero integers and P1 different from P2 (P1 may be greater than or less than P2).

The number of secondary reference solar modules 21(*j*) and the choice of their offset angles OFF(j) (pitch, signs, values) depends in particular on the host site of the solar array 1 (configuration, environment such as the presence of hills, mountains, water bodies, etc.) and of the technology of the solar collector 5.

Then, the piloting unit 7 implements the following steps:
receiving a solar energy production value P(i) from each reference solar module 20(*i*);
addressing to the solar modules 3 (except for the reference solar modules 20(*i*)), as common orientation setpoint COC, the reference orientation reference COR(i) associated to the reference solar module 20(*i*) having the highest solar energy production value P(i).

Thus, the piloting unit 7 pilots the angular orientation of the solar modules 3 by applying as common orientation setpoint the reference orientation reference COR (i) associated to the reference solar module 20(*i*) having the highest solar energy production value P(i). In other words, COC=COR(m)=COI+m·PA wherein P(m) corresponds to the maximum of the P(i).

If the highest solar energy production value is associated to the secondary reference orientation setpoint COR(j) associated to a secondary reference solar module 20(*j*), then the piloting unit 7 implements the piloting of the angular orientation of the solar modules 3 by applying, as common orientation setpoint COC, said secondary reference orientation setpoint COR(j), only if this secondary reference solar module 20(*j*) has the highest solar energy production value P(j) during a predefined waiting time DAT.

This waiting time DAT is established depending on at least one of the following parameters:
an energy consumption necessary to modify the orientation of the solar modules 3, except for the reference solar modules 20(*i*), the offset angle OFF(j) associated to the secondary reference solar module 20 (*j*) having the highest solar energy production value P(j);
a wear rate of mechanical members of the solar trackers 4 of the solar modules 3, except for the reference solar modules 20 (*i*), solicited during a change of orientation of the offset angle OFF(j) associated to the secondary reference solar module 20(*j*) having the highest solar energy production value P(j).

Thus, particularly in the case of diffuse radiation and/or albedo if the photovoltaic panels are of the double-sided type, the reference solar power plant 2 allows detecting that an offset angle OFF(j) applied with respect to the initial orientation setpoint COI, will provide an increase in the solar energy production, and the piloting unit 7 will postpone this offset angle OFF(j) to the set of solar modules 3 in order to increase the power production of the solar array 1.

Of course the implementation example mentioned above is not limiting and other improvements and details can be added to the solar array according to the invention, without departing from the scope of the invention wherein other forms of solar modules and/or solar collectors may be for example carried out.

The invention claimed is:
1. A solar array comprising:
solar modules distributed in parallel rows, each solar module comprising at least one solar collector carried by a single-axis solar tracker, wherein each single-axis solar tracker is piloted in rotation about a main axis by an actuator for a rotation of the solar module allowing tracking the Sun during its rise and set from east to west;

a reference solar power plant comprising at least two reference solar modules, including a central reference solar module and at least one secondary reference solar module; and a piloting unit of angular orientation of the solar modules, the piloting unit being linked to the actuators to servo-control the angular orientation of the solar modules by applying a common orientation setpoint to the solar modules, wherein the piloting unit is configured to:

pilot the angular orientation of the central reference solar module according to a central reference orientation setpoint corresponding to an initial orientation setpoint, pilot the orientation of the at least one secondary reference solar module according to a secondary reference orientation setpoint, the secondary reference orientation setpoint corresponding to the initial orientation setpoint shifted by a non-zero offset angle associated with the at least one secondary reference solar module, the central reference solar module being associated with a zero offset angle;

receive a solar energy production value from each of the at least two reference solar modules; and pilot the angular orientation of the solar modules, except for the at least two reference solar modules, by applying as a common orientation setpoint the reference orientation setpoint associated with a reference solar module of the at least two reference solar modules having the highest solar energy production value.

2. The solar array according to claim 1, wherein the reference solar power plant comprises secondary reference solar modules each associated with a dedicated offset angle.

3. The solar array according to claim 2, wherein the reference solar power plant comprises a number N of secondary reference solar modules associated with positive offset angles and a number M of secondary reference solar modules associated with negative offset angles, wherein N and M are integers.

4. The solar array according to claim 2, wherein a deviation between two adjacent offset angles is less than or equal to 3 degrees in absolute value.

5. The solar array according to claim 1, further comprising, at an input of the piloting unit, a calculation unit configured to calculate the initial orientation setpoint based on an astronomical calculation of the position of the Sun.

6. The solar array according to claim 5, wherein the calculation unit is further configured to calculate the initial orientation setpoint based on at least one of minimum orientations of the single-axis solar trackers, maximum orientations of the single-axis solar trackers, and shadings of solar modules of a row on solar modules of an adjacent row.

7. The solar array according to claim 1, wherein the piloting unit is configured to pilot the angular orientation of the solar modules, except for the at least two reference solar modules, by applying as a common orientation setpoint the secondary orientation setpoint applied to a secondary reference solar module of the at least one secondary reference solar module having the highest solar energy production value, if the secondary reference solar module of the at least one secondary reference solar module has the highest solar energy production value for a predefined waiting time.

8. The solar array according to claim 1, wherein the at least one solar collector is a photovoltaic panel.

9. A method for managing a solar array comprising solar modules distributed in parallel rows, the method comprising:

calculating an initial orientation setpoint;

piloting an angular orientation of a central reference solar module according to a central reference orientation setpoint corresponding to the initial orientation setpoint;

piloting an orientation of a secondary reference solar module according to a secondary reference orientation setpoint, the secondary reference orientation setpoint corresponding to the initial orientation setpoint shifted by a non-zero offset angle associated with the secondary reference solar module;

receiving a solar energy production value from each of at least two reference solar modules including the central reference solar module and the secondary reference solar module; and piloting the angular orientation of the solar modules, except for the at least two reference solar modules, by applying as a common orientation setpoint the reference orientation setpoint associated with a reference solar module of the at least two reference solar modules having the highest solar energy production value.

10. The method according to claim 9, wherein, if the highest solar energy production value is associated with the secondary reference orientation setpoint associated with the secondary reference solar module, then the method implements the piloting of the angular orientation of the solar modules, except for the at least two reference solar modules, by applying as a common orientation setpoint the secondary reference orientation setpoint, if the secondary reference solar module has the highest solar energy production value for a predefined waiting time.

11. The method according to claim 10, wherein the predefined waiting time is established based on at least one of:

an energy consumption necessary to modify the orientation of the solar modules, except for the at least two reference solar modules, the offset angle associated with the secondary reference solar module having the highest solar energy production value; and a wear rate of mechanical members of solar trackers of the solar modules, except for the at least two reference solar modules, solicited during a change of orientation of the offset angle associated with the secondary reference solar module having the highest solar energy production value.

12. The method according to claim 9, wherein the initial orientation setpoint is calculated based on an astronomical calculation of the position of the Sun.

* * * * *